United States Patent [19]
Kameyama et al.

[11] Patent Number: 5,273,943
[45] Date of Patent: Dec. 28, 1993

[54] DIELECTRIC CERAMIC COMPOSITIONS AND MICROWAVE DEVICES USING THE SAME

[75] Inventors: Ichirou Kameyama; Hiroshi Kagata; Tatsuya Inoue; Junichi Kato, all of Osaka, Japan

[73] Assignee: Matsushita Electric Industrial Co., Ltd., Osaka, Japan

[21] Appl. No.: 21,441

[22] Filed: Feb. 24, 1993

[30] Foreign Application Priority Data

Feb. 28, 1992 [JP] Japan .................................. 4-042880
Apr. 23, 1992 [JP] Japan .................................. 4-104922
Sep. 8, 1992 [JP] Japan .................................. 4-239065
Oct. 21, 1992 [JP] Japan .................................. 4-282657

[51] Int. Cl.[5] .................. H01G 4/10; H01G 4/12; C04B 35/00
[52] U.S. Cl. ................................... 501/135; 428/471
[58] Field of Search ............... 501/134, 135; 361/321; 428/471, 697

[56] References Cited

U.S. PATENT DOCUMENTS

| | | | |
|---|---|---|---|
| 3,847,829 | 11/1974 | Bouchard | 501/126 |
| 3,997,457 | 12/1976 | Takahashi et al. | 501/136 |
| 4,227,036 | 10/1980 | Fitzgerald | 174/16 HS |
| 4,330,631 | 5/1982 | Kawashima et al. | 501/139 |
| 4,638,401 | 1/1987 | Ling et al. | 361/321 |
| 4,978,646 | 12/1990 | Bardhan et al. | 501/135 |
| 5,004,713 | 4/1991 | Bardhan et al. | 501/135 |

FOREIGN PATENT DOCUMENTS 2438910 2/1975 Fed. Rep. of Germany ...... 501/135

OTHER PUBLICATIONS

Journal of American Ceramic Society, vol. 67 (1984); pp. 278-281.

Primary Examiner—Mark L. Bell
Assistant Examiner—Deborah Jones
Attorney, Agent, or Firm—Lowe, Price, LeBlanc & Becker

[57] ABSTRACT

A dielectric ceramic composition which consists essentially of a sintered mixture represented by the formula $$xBiO_{3/2}\text{-}y[(Ca_{1-a-b}Zn_aPb_b)O]\text{-}zNbO_{5/2}$$

wherein x, y and z independently represent a molar fraction and $x+y+z=1$, x, y and z are within a pentagonal range surrounded by lines, inclusive, plotted between points, A, B, C, D and E in a ternary ceramic composition of FIG. 1 where a is an atomic ratio of substituted Zn to Ca and b is an atomic ratio of substituted Pb to Ca, and $0 < a \leq 0.6$ and $0 \leq b \leq 0.4$. The points A, B, C, D and E, respectively, correspond to those points of (x, y, z)=(0.55, 0.16, 0.29), (x, y, z)=(0.5, 0.21, 0.29), (x, y, z)=(0.5, 0.175, 0.325), (x, y, z)=(0.345, 0.28, 0.375), and (x, y, z)=(0.345, 0.245, 0.41). Microwave devices making use of the ceramic composition are also described.

13 Claims, 3 Drawing Sheets

DIELECTRIC CERAMIC COMPOSITIONS AND MICROWAVE DEVICES USING THE SAME

BACKGROUND OF THE INVENTION

1. Field of the Invention

This invention relates to novel dielectric ceramic compositions which are adapted for use in microwave ranges. The invention also relates to microwave devices using the above compositions.

2. Description of the Prior Art

In recent year, mobile communication devices which make use of electromagnetic waves in the microwave range have been conspicuously developed. Typical of such devices are car telephones, portable telephones and the like. This, in turn, very strongly demands the miniaturization of the devices. In order to meet the demand, it will be necessary to miniaturize individual components of the devices. Dielectric ceramics have been frequently built in, as a dielectric resonator, resonator components of these devices such as filter elements, oscillator elements and the like. For the same resonance mode, the size of the dielectric resonator is inversely proportional to the square root of the dielectric constant of the dielectric ceramic used. In order to make a smaller-size dielectric resonator, use of a dielectric ceramic having a higher dielectric constant is essential. Other characteristic properties which the dielectric ceramics should have include a low loss in the microwave range, i.e. a high value of unloaded Q, and a small temperature variation of resonance frequency, i.e. a small temperature variation of dielectric constant.

Up to now, a great number of ceramics have been proposed for use as dielectric resonators. For instance, $BaO$-$TiO_2$-$Sm_2O_3$ ceramics which have been disclosed in U.S. Pat. No. 4,330,631 are set forth as having a high dielectric constant. More particularly, the ceramics have a specific dielectric constant of approximately 80, an unloaded Q value as high as approximately 3000 at 2 to 4 GHz, and a small temperature coefficient of resonance frequency. As ceramics whose dielectric constant is over 90, there have been reported $BaO$-$PbO$-$TiO_2$-$Nd_2O_3$ ceramics in Journal of American Ceramic Society Vol. 67(1984), pp. 278-281.

For realizing miniaturization and high performance of resonator components, there is known a multilayer structure of conductor layers and ceramic layers. The conductors used for the multilayer device should have high conductivity because of the use in a high frequency range and have to be made of Cu, Ag, Au or alloys thereof. On the other hand, the dielectric ceramics for such devices should be sintered along with the conductor metals. More particularly, the ceramics should be sintered under conditions where the conductor metals are not molten and oxidized. To this end, the ceramic material should be densely sintered at low temperatures not higher than 1075° C. If Cu is used as the conductor, the ceramic material does not suffer characteristic degradation when sintered at a low partial pressure of oxygen.

Known ceramics for microwave service including the afore-described dielectric ceramics have a sintering temperature as high as approximately 1300° C. Eventually, these ceramics cannot be sintered simultaneously with the conductor metals having high electric conductivity, making it difficult to provide a multilayer device.

Dielectric ceramics which are sinterable at low temperatures include Bi-based ceramics. Among them, $Bi_2(ZnNb_2)O_6$-$Bi_3(Ni_2Nb)_9$ ceramics which are disclosed in U.S. Pat. No. 4,638,401 are set forth as adapted for a multilayer capacitor. The ceramics are sinterable at approximately 950° C. and have a high dielectric constant of 90 and a good temperature characteristic of the dielectric constant.

However, there have never been known any dielectric ceramics which can be used in the microwave range, have a high dielectric constant and are sintered at low temperatures. The above-mentioned Bi-based ceramics are of no exception for this purpose.

SUMMARY OF THE INVENTION

It is accordingly an object of the invention to provide a novel dielectric ceramic composition which is sinterable along with a conductor metal such as Cu, Au, Ag or alloys thereof and which has a high dielectric constant, a small loss and good temperature characteristics in the microwave range.

It is another object of the invention to provide a microwave device of the multilayer type which makes use of the novel ceramic composition whereby small-size resonator components can be fabricated as would be demanded.

According to one embodiment of the invention, there is provided a dielectric ceramic composition which consists essentially of a sintered mixture represented by the formula

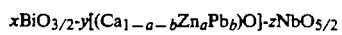

$$xBiO_{3/2}\text{-}y[(Ca_{1-a-b}Zn_aPb_b)O]\text{-}zNbO_{5/2}$$

wherein x, y and z independently represent a molar fraction and $x+y+z=1$, x, y and z are within a pentagonal range surrounded by lines, inclusive, plotted between points, A, B, C, D and E in a ternary ceramic composition of FIG. 1 where a is an atomic ratio of substituted Zn to Ca and b is an atomic ratio of substituted Pb to Ca, and $0 < a \leq 0.6$ and $0 \leq b \leq 0.4$. The points A, B, C, D and E, respectively, correspond to those points of $(x, y, z) = (0.55, 0.16, 0.29)$, $(x, y, z) = (0.5, 0.21, 0.29)$, $(x, y, z) = (0.5, 0.175, 0.325)$, $(x, y, z) = (0.345, 0.28, 0.375)$, and $(x, y, z) = (0.345, 0.245, 0.41)$.

The ceramic composition having such a formulation as defined above has an improved dielectric constant and a low sintering temperature. When the dielectric ceramic is sintered at temperatures not higher than 1075° C. in air or in an inert gas such as $N_2$ under a low partial pressure of oxygen, a densely sintered ceramic can be obtained. The sintered ceramic composition has good characteristics in a microwave range of from 2 to 6 MHz such as a dielectric constant of not lower than 70, an unloaded Q value of not lower than 200 and an absolute value of temperature coefficient of resonance frequency of not higher than 50 ppm/°C.

This permits fabrication of multilayer devices which make use of conductor metals such as Cu, Au, Ag or alloys thereof. In addition, since the ceramic composition has a high dielectric constant, small-size resonator parts can be conveniently made. Moreover, the ceramic composition can be utilized as a substrate of microwave circuits with great industrial merits.

According to another embodiment of the invention, there is provided a microwave device which comprises a body made of sintered dielectric ceramic layers, a pair of spaced shield conductor metal layers formed on opposite sides of the body for connection to ground, and a strip line metal conductor layer provided between and spaced from the pair of spaced shield conductor metal layers through the ceramic layer on each side of the strip line metal conductor layer and made of a member selected from the group consisting of Cu, Ag, Au and mixtures and alloys thereof, the sintered dielectric ceramic layers which are provided between the pair of spaced shield conductor metal layers in contact with the strip line metal conductor layer on the opposite sides thereof being made of a dielectric ceramic composition of the above-defined formula. If necessary, dielectric layers may be further formed on the respective spaced shield conductor metal layers to cover the layers therewith. In this case, the covering dielectric layers may be made of the ceramic composition defined above or made of alumina or low melting point glass.

Moreover, the microwave device may further comprise a conductor metal layer for forming a capacitance gap with the strip line metal conductor layer whereby the device has a capacitor built therein.

DETAILED DESCRIPTION AND EMBODIMENTS OF THE INVENTION

Preparation of the dielectric ceramic composition of the invention is first described.

Starting materials for the composition include, for example, $Bi_2O_3$, $CaCO_3$, $ZnO$ and $Nb_2O_5$ with or without further addition of PbO. These starting materials should be highly pure and have, respectively, a purity of not less than 99.9%.

The starting materials in the form of powder are weighed to give intended mixing ratios. These powders are mixed in a suitable means such as a ball mill along with a liquid medium such as water. After completion of the mixing, the resultant slurry is dried and calcined at 750° to 900° C. The calcined product is broken into pieces and dried to obtain a powder. The thus obtained powder is subsequently sintered at 850° to 1200° C. in air for an appropriate time. If it is desired to shape the powder, a solution of an appropriate resin binder such as polyvinyl alcohol is added to the powder, followed by shaping in a desired form and sintering. By this, a dielectric sintered ceramic composition can be readily obtained. More particularly, the ceramic composition of the invention can be readily prepared by ordinary powder processing techniques.

In order to attain desired properties such as sinterability at temperatures not higher than 1075° C., a dielectric constant of not less than 70, an unloaded Q value of not less than 200 and an absolute value of temperature coefficient of resonance frequency of not larger than 50 ppm/°C., the ceramic composition should consist essentially of a sintered mixture of the formula

Figure 1:
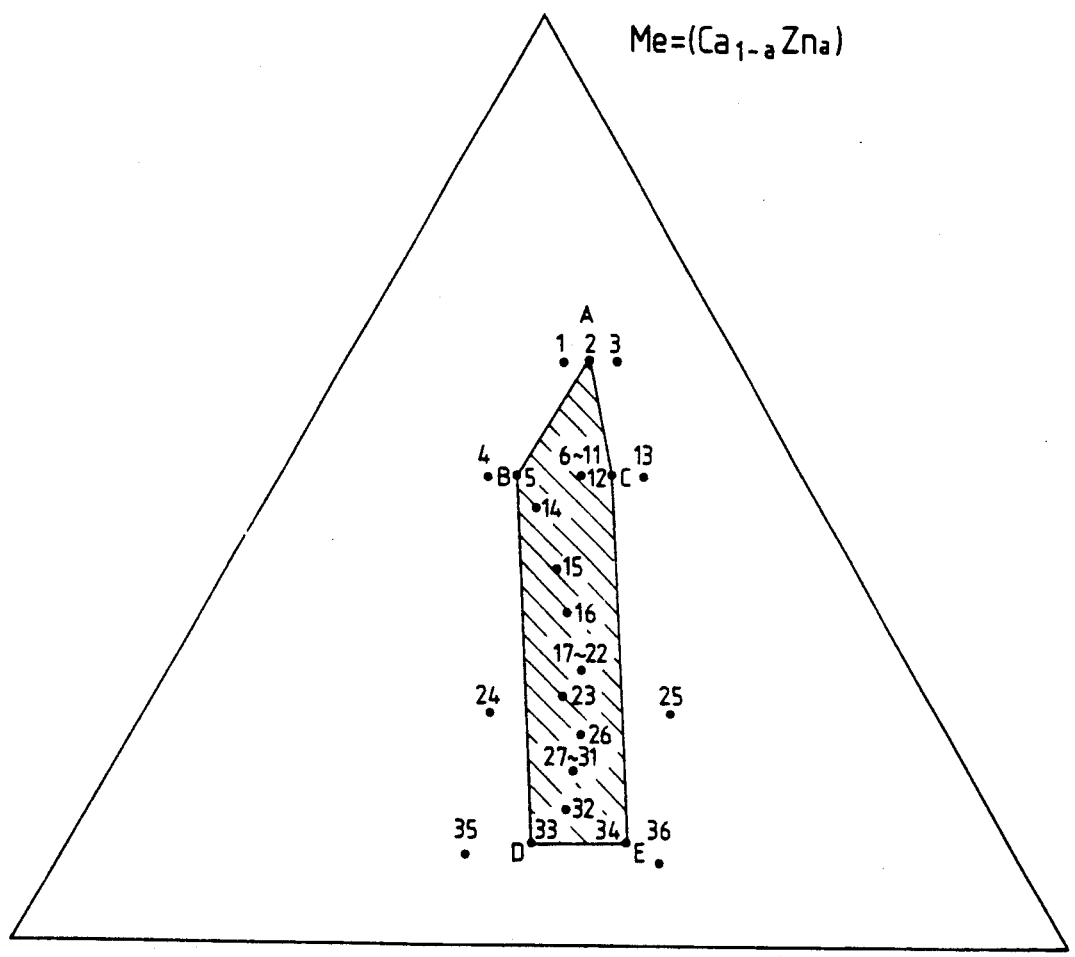
FIG. 1 is a ternary ceramic composition diagram showing a compositional range of dielectric ceramic compositions according to the invention.

wherein x, y and z independently represent a molar fraction and $x+y+z=1$, x, y and z are within a pentagonal range defined by lines, inclusive, plotted between points A, B, C, D and E in a ternary ceramic composition of FIG. 1, and $0 < a \leq 0.6$. The points A, B, C, D and E, respectively, correspond to those points of (x, y, z) = (0.55, 0.16, 0.29), (x, y, z) = (0.5, 0.21, 0.29), (x, y, z) = (0.5, 0.175, 0.325), (x, y, z) = (0.345, 0.28, 0.375), and (x, y, z) = (0.345, 0.245, 0.41).

Alternatively, the ceramic composition should also consist essentially of a sintered mixture of the formula wherein Ca is partly substituted with Zn and Pb,

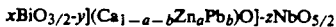

wherein x, y and z independently represent a weight fraction and $x+y+z=1$, x, y and z are within a pentagonal range defined by lines plotted between points, A, B, C, D and E in a ternary ceramic composition of FIG. 1, and $0 < a \leq 0.6$ and $0 < b \leq 0.4$. In this case, the points A, B, C, D and E have, respectively, the same meanings as defined above.

In both compositions, if Cu component is further added to the respective compositions in such an amount that $Cu/(Bi+Ca+Zn+Nb) \leq 0.06$ or $Cu/(Bi+Ca+Zn+Pb+Nb) \leq 0.06$, the sintering temperature can be further lowered with the unloaded Q value being improved.

Reference is now made to FIGS. 2 to 5 which shows a dielectric resonator as a typical multilayer microwave device. The dielectric resonator has a structure in which strip line conductor layer and shield conductor metal layers are interleaved within a dielectric sintered body in a spaced relation, thereby making a structure wherein the coupling capacitor is built therein.

Figure 2:
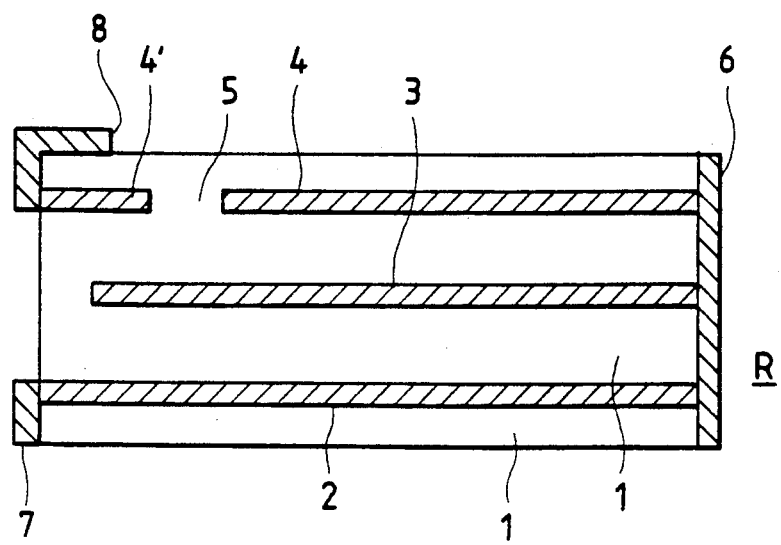
FIG. 2 is a longitudinal sectional view of a multilayer dielectric resonator of a capacitor built-in type according to an embodiment of the invention.

More particularly, a dielectric resonator unit R includes a sintered dielectric ceramic body 1 having a multilayer structure which includes layers 1a, 1b, 1c and 1d as shown. A pair of shield conductor metal layers 2 and 4, and a strip line conductor layer 3 are interleaved, as spaced from one another, in the body 1 as shown in these figures. A conductor metal layer 4' is also provided to give a capacitance gap 5 between it and the layer 3 in order to establish a coupling capacitor. A plurality of external electrodes 6, 7 and 8 are provided in position of the body 1 while allowing electromagnetic contacts of the electrode 6 with the conductor metal layer 2, 3 and 4, respectively, at one side thereof as shown in FIG. 2. The conductor layer 3 is free at the other side. The layers 2 and 4 are electromagnetically connected at the other side with the external electrode 6, 7 for connection to ground. Thus, a coupling capacitor built-in resonator which has the shield conductor layers can be fabricated. The conductor metal layers 3 and 4' should be made of Cu, Ag, Au, and mixtures alloys thereof. In order to control the sintering temperature for the layers 3 and 4' depending on the ceramic composition used, platinum group metals such as Pd, Pt and the like or W may be added to the mixture or alloy up to 10 wt %. If these metals are added, the temperature can be increased. The conductor metal layers 2 and 4 may also be made of the metals or mixtures or alloys thereof defined above with or without further addition of the platinum group metal or W although other metals may be used. The external electrodes may be made of conductive metals or alloys including those defined hereinabove with respect to the conductor layers 3 and 4'.

It will be noted that the external electrode 8 is provided in contact with the conductor metal layer 4' so as to take out input and output signals of the coupling capacitor established between the layers 3 and 4'. The layer 4' has both signal input and output functions in this case.

It is important to note that the layers 1b and 1c of the ceramic body 1 which are provided between the pair of the conductor metal layers 2 and 4 and has the strip line conductor metal layer 3 therein be made of the sintered ceramic composition of the invention. By the use of the composition, low temperature sintering is possible with improvements of the characteristic properties of the device.

This type of resonator is known in the art except that the sintered ceramic body is made of the novel composition of the invention, and its fabrication is briefly set forth below.

Figure 5A:
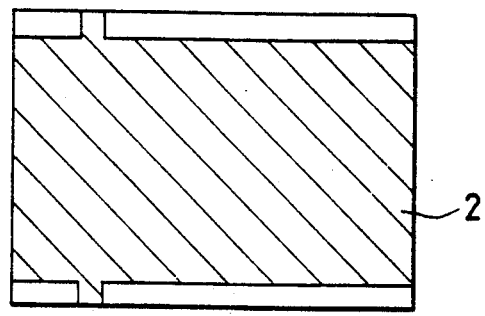
FIGS. 5a to 5c are, respectively, schematic plan views showing print patterns of three conductor metal layers of the resonator of FIG. 1.
Figure 5B:
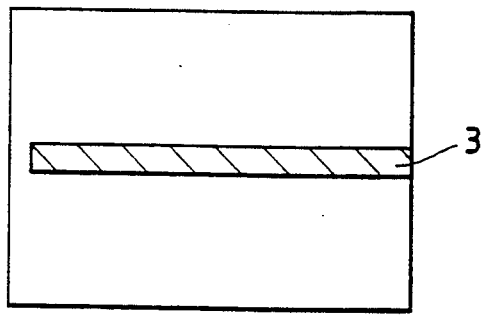
Figure 5C:
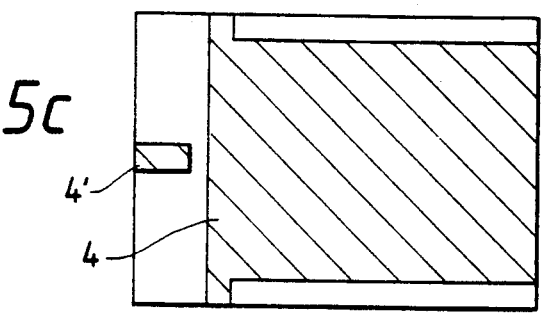

Starting materials for the dielectric ceramic composition are calcined and broken into fine pieces. The fine pieces are dispersed in a solution of an organic binder and a plasticizer to obtain a slurry. Thin sheets of the ceramic dispersion in the organic binder are obtained from the slurry by coating and drying. If Cu is used as the conductor metal layer, a CuO paste is printed onto a plurality of the ceramic sheets in a desired pattern as shown in FIG. 5a, on which a plurality of the ceramic sheets are built up. Further, a patterned conductor metal layer is formed on the uppermost ceramic sheet as shown in FIG. 5b, followed by building up a plurality of the ceramic sheets and formation of another patterned conductor metal layer as shown in FIG. 5c.

In this arrangement, the builtup dielectric layers 1b and 1c provided between the conductor metal layers 2 and 4 should consist essentially of the dielectric ceramic composition of the invention. Other layers 1a and 1d may be made of the composition of the invention. Alternatively, low sintering materials such as alumina, glass and the like may be used for this purpose. Moreover, the strip line conductor metal layer 3 and the layer 4' should be made of Cu, Ag, Au, and a mixture or alloy thereof with or without a platinum group metal or W. If the platinum group metal or W is present in the mixture or alloy, the amount is up to 10 wt % of the mixture or alloy.

The built-up layers are subsequently thermally compressed and cut into individual elements. The elements are thermally treated in air to remove the binder by application of heat. If CuO paste is used, the element is thermally treated in an atmosphere of $H_2$ to reduce it into Cu and sintered in $N_2$. With other metals or mixtures or alloys thereof with or without W or a platinum group metal, sintering is carried out in air.

When using the ceramic composition of the invention, the sintering temperature is generally in the range of from 850° to 1150° C., preferably not higher than 1050° C.

The strip line conductor layer 3 has been illustrated as linear but may be curved, stepped or the like. If a plurality of the resonators are used in combination with capacitors, there may be readily obtained a band pass filter.

The microwave device of the type which has the shield conductors and the coupling capacitor has been described hereinabove. The composition of the invention is particularly suitable for this type of device. Nevertheless, the ceramic composition of the invention may be appropriately used as other types of microwave devices such as a so-called balanced strip line for microwave transmission.

Figure 6:
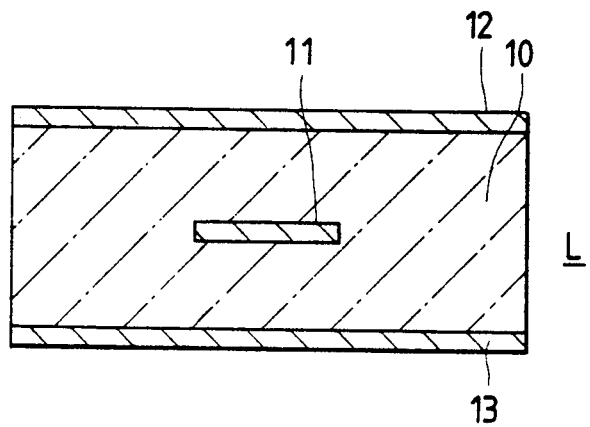
FIG. 6 is a schematic sectional view of a balanced strip line for microwave transmission.

FIG. 6 shows a strip line L which includes a dielectric sintered ceramic body 10 having a narrow strip line 11 built therein and a pair of conductor layers 12, 13 disposed on upper and lower sides of the body 10 for connection to ground. In this case, the conductor layers 12, 13 which are not built in may be made of a metal other than Cu, Ag, Au or the like. However, the narrow strip line 11 should be made of Cu, Ag, Au, and mixtures and alloys thereof since the line 11 has to be sintered along with the ceramic composition.

The present invention is more particularly described by way of examples.

EXAMPLE 1

$Bi_2O_3$, $CaCO_3$, ZnO and $Nb_2O_5$ which were, respectively, highly pure were provided in the form of powders as starting materials. After correction in purity of the starting materials, they were weighed in different amounts to have values of x, y, z and a, indicated in Table 1, in the ceramic composition of the formula,

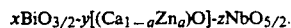

$$xBiO_{3/2}\text{-}y[(Ca_{1-a}Zn_a)O]\text{-}zNbO_{5/2}.$$

The weighed powders for individual compositions were placed in a polyethylene ball mill, to which stabilized zirconia balls and pure water, followed by mixing over 17 hours. After completion of the mixing, the resultant slurry was dried to powder and placed in an alumina crucible, followed by calcination at a temperature of 750° to 900° C. for 2 to 5 hours. The calcined product was ground by means of an automated mortar, followed by powdering in the ball mill over 17 hours and drying to obtain a starting powder.

The powder was mixed with 6 wt % of a 5% polyvinyl alcohol aqueous solution as a binder and passed through a 32 mesh sieve to obtain particles. The particles were press molded at 100 MPa to obtain a cylinder molding with a diameter of 13 mm and a thickness of about 5 mm. The cylinder-shaped molding was heated at 650° C. for 2 hours to burn out the binder and placed in a magnesia container. Thereafter, the container was closed and the content was sintered in air at a temperature of 850° to 1200° C. for 2 to 4 hours. Sintered products which were obtained by sintering at a temperature at which the density became maximum were subjected to measurement of dielectric characteristics in a microwave range. The unloaded Q value (Qu) was determined according to a cavity method. The dielectric constant was calculated from the size of the sintered product and the resonance frequency. The resonance frequency was found to range from 2 to 5 MHz. The resonance frequency at −25° C., 20° C. and 85° C. was measured and the temperature coefficient (τ f) according to the method of least squares. The results are shown in Table 1 below.

TABLE 1

| Sample No. | Composition x | y | z | a | Sintering Temperature °C. | Dielectric Constant | Qu | τ f ppm/°C. |
|---|---|---|---|---|---|---|---|---|
| 1# | 0.55 | 0.165 | 0.285 | 0.3 | 875 | 85 | 170 | +26 |
| 2 | 0.55 | 0.16 | 0.29 | 0.3 | 875 | 87 | 250 | +18 |
| 3# | 0.55 | 0.155 | 0.295 | 0.3 | 950 | 89 | 160 | +11 |
| 4# | 0.5 | 0.215 | 0.285 | 0.3 | 875 | 72 | 90 | −12 |
| 5 | 0.5 | 0.21 | 0.29 | 0.3 | 900 | 76 | 240 | −9 |
| 6# | 0.5 | 0.19 | 0.31 | 0 | 975 | 65 | 480 | +29 |
| 7 | 0.5 | 0.19 | 0.31 | 0.1 | 925 | 71 | 330 | +20 |
| 8 | 0.5 | 0.19 | 0.31 | 0.3 | 900 | 82 | 260 | +1 |
| 9 | 0.5 | 0.19 | 0.31 | 0.45 | 900 | 90 | 230 | −15 |
| 10 | 0.5 | 0.19 | 0.31 | 0.6 | 900 | 94 | 230 | −45 |
| 11# | 0.5 | 0.19 | 0.31 | 0.7 | 900 | 96 | 210 | −78 |
| 12 | 0.5 | 0.175 | 0.325 | 0.3 | 950 | 87 | 220 | +2 |
| 13# | 0.5 | 0.165 | 0.335 | 0.3 | 975 | 91 | 70 | −26 |
| 14 | 0.475 | 0.21 | 0.315 | 0.25 | 925 | 75 | 350 | +7 |
| 15 | 0.46 | 0.215 | 0.325 | 0.25 | 925 | 77 | 400 | +4 |
| 16 | 0.445 | 0.22 | 0.335 | 0.25 | 925 | 80 | 440 | +1 |
| 17# | 0.42 | 0.225 | 0.355 | 0 | 1025 | 59 | 740 | +24 |
| 18 | 0.42 | 0.225 | 0.355 | 0.1 | 975 | 78 | 610 | +10 |
| 19 | 0.42 | 0.225 | 0.355 | 0.25 | 950 | 91 | 570 | +3 |
| 20 | 0.42 | 0.225 | 0.355 | 0.3 | 925 | 88 | 430 | −28 |
| 21 | 0.42 | 0.225 | 0.355 | 0.6 | 900 | 80 | 230 | −45 |
| 22# | 0.42 | 0.225 | 0.355 | 0.7 | 900 | 78 | 220 | −78 |
| 23 | 0.41 | 0.235 | 0.355 | 0.25 | 925 | 91 | 510 | +6 |
| 24# | 0.4 | 0.265 | 0.335 | 0.25 | 975 | 84 | 150 | +74 |
| 25# | 0.4 | 0.2 | 0.4 | 0.25 | 1075 | 101 | 80 | −82 |
| 26 | 0.405 | 0.23 | 0.365 | 0.25 | 975 | 98 | 530 | +19 |
| 27# | 0.375 | 0.25 | 0.375 | 0 | 1150 | 71 | 350 | +79 |
| 28 | 0.375 | 0.25 | 0.375 | 0.1 | 1075 | 89 | 440 | +43 |
| 29 | 0.375 | 0.25 | 0.375 | 0.25 | 1050 | 106 | 660 | +11 |
| 30 | 0.375 | 0.25 | 0.375 | 0.6 | 975 | 84 | 480 | −26 |
| 31# | 0.375 | 0.25 | 0.375 | 0.8 | 950 | 64 | 140 | −69 |
| 32 | 0.36 | 0.26 | 0.38 | 0.25 | 1075 | 107 | 470 | +26 |
| 33 | 0.345 | 0.28 | 0.375 | 0.25 | 1000 | 104 | 270 | +47 |
| 34 | 0.345 | 0.245 | 0.41 | 0.25 | 1075 | 108 | 250 | +39 |
| 35# | 0.34 | 0.29 | 0.37 | 0.25 | 975 | 102 | 120 | +110 |
| 36# | 0.34 | 0.24 | 0.42 | 0.25 | 1125 | 109 | 80 | +150 |

In the above table, compositions of Sample Numbers with the mark "#" are outside the scope of the invention and thus for comparison.

The Sample Numbers are depicted in FIG. 1 wherein the figures, respectively, correspond to the Sample Numbers. As will be apparent from the results of Table 1, the compositions which are within the scope of the present invention can be densely sintered at temperatures as low as not higher than 1075° C. Moreover, the compositions of the invention have a dielectric constant of not less than 70, an unloaded Q value of not less than 200 and an absolute value of the temperature coefficient of resonance frequency of not higher than 50 ppm/°C. In particular, the composition of No. 29 could be densely sintered at 1050° C. and exhibited good microwave dielectric characteristics such as a dielectric constant as high as 106, an unloaded Q value of 660 and a temperature coefficient of resonance frequency of +11 ppm/°C. In addition, when sintered in $N_2$, the composition underwent little change with respect to the sintering temperature and the characteristics. With the composition which are outside the scope of the invention, the unloaded Q value becomes less than 200 with the absolute value of the temperature coefficient of resonance frequency being larger than 50 ppm/°C. These composition are considered as being not suitable for practical applications.

EXAMPLE 2

Starting materials were weighed so that the compositional ratios x, y and z were selected as those ratios of Sample Nos. 9, 15 and 23 of Table 1 and the ratio, a, of substituted Zn to and the ratio of the substituted Pb to Ca were determined as indicated in Table 2. These starting materials were sintered and subjected to evaluation of the characteristics in the same manner as in Example 1.

The results are shown in Table 2 below.

TABLE 2

| Sample No. | Composition x | y | z | a | b | Sintering Temperature °C. | Dielectric Constant | Qu | τ f ppm/°C. |
|---|---|---|---|---|---|---|---|---|---|
| 9a# | 0.5 | 0.19 | 0.31 | 0.45 | 0 | 900 | 90 | 230 | −15 |
| 9b | 0.5 | 0.19 | 0.31 | 0.45 | 0.2 | 900 | 89 | 290 | −16 |
| 9c | 0.5 | 0.19 | 0.31 | 0.45 | 0.4 | 900 | 89 | 240 | −17 |
| 9d# | 0.5 | 0.19 | 0.31 | 0.45 | 0.5 | 900 | 88 | 190 | −17 |
| 15a# | 0.46 | 0.215 | 0.325 | 0.25 | 0 | 925 | 77 | 400 | +4 |
| 15b | 0.46 | 0.215 | 0.325 | 0.25 | 0.2 | 925 | 76 | 450 | +4 |
| 15c | 0.46 | 0.215 | 0.325 | 0.25 | 0.4 | 925 | 76 | 430 | +3 |
| 15d# | 0.46 | 0.215 | 0.325 | 0.25 | 0.5 | 950 | 75 | 380 | +3 |
| 23a# | 0.41 | 0.235 | 0.355 | 0.25 | 0 | 925 | 91 | 510 | +6 |
| 23b | 0.41 | 0.235 | 0.355 | 0.25 | 0.2 | 925 | 90 | 550 | +6 |
| 23c | 0.41 | 0.235 | 0.355 | 0.25 | 0.4 | 925 | 89 | 530 | +6 |

TABLE 2-continued

| Sample No. | Composition | | | | | Sintering Temperature °C. | Dielectric Constant | Qu | τ f ppm/°C. |
| --- | --- | --- | --- | --- | --- | --- | --- | --- | --- |
| | x | y | z | a | b | | | | |
| 23d# | 0.41 | 0.235 | 0.355 | 0.25 | 0.5 | 950 | 88 | 480 | +4 |

In the above table, compositions of Sample Numbers with the mark "#" are outside the scope of the invention and thus for comparison.

As will be apparent from the results of Table 2, the substitution of Pb within the scope of the invention can increase the unloaded Q value but the substitution of Pb which exceeds the scope of the invention undesirably results in an unloaded Q value which is lower than that attained without the substitution.

EXAMPLE 3

Compositions of the main components selected were those of Sample Nos. 8, 19 and 29, to which CuO was added in different amounts as a Cu component. These components were used to prepare sintered products and measure the characteristics in the same manner as in Example 1. The results are shown in Table 3.

TABLE 3

| Sample No. | Composition | | | | | Sintering Temperature °C. | Dielectric Constant | Qu | τ f ppm/°C. |
| --- | --- | --- | --- | --- | --- | --- | --- | --- | --- |
| | x | y | z | a | c | | | | |
| 8a | 0.5 | 0.19 | 0.31 | 0.3 | 0 | 900 | 82 | 260 | +1 |
| 8b | 0.5 | 0.19 | 0.31 | 0.3 | 0.02 | 875 | 80 | 400 | 0 |
| 8c | 0.5 | 0.19 | 0.31 | 0.3 | 0.06 | 875 | 77 | 370 | −3 |
| 8d# | 0.5 | 0.19 | 0.31 | 0.3 | 0.08 | 850 | 71 | 220 | −11 |
| 19a | 0.42 | 0.225 | 0.355 | 0.25 | 0 | 950 | 91 | 570 | +3 |
| 19b | 0.42 | 0.225 | 0.355 | 0.25 | 0.02 | 925 | 90 | 670 | −15 |
| 19c | 0.42 | 0.225 | 0.355 | 0.25 | 0.06 | 900 | 87 | 620 | −14 |
| 19d# | 0.42 | 0.225 | 0.355 | 0.25 | 0.08 | 875 | 81 | 520 | −25 |
| 29a | 0.375 | 0.25 | 0.375 | 0.25 | 0 | 1050 | 106 | 660 | +11 |
| 29b | 0.375 | 0.25 | 0.375 | 0.25 | 0.02 | 1000 | 104 | 720 | +3 |
| 29c | 0.375 | 0.25 | 0.375 | 0.25 | 0.06 | 975 | 101 | 670 | −12 |
| 29d# | 0.375 | 0.25 | 0.375 | 0.25 | 0.08 | 975 | 95 | 560 | −28 |

In the above table, compositions of Sample Numbers with the mark "#" are outside the scope of the invention and thus for comparison.
"c" in the composition means a value of Cu/(Bi + Ca + Zn + Nb).

As will be apparent from the results of Table 3, the addition of Cu component in amounts within the scope of the invention can improve the unloaded Q value. On the other hand, the amount of Pb which exceeds the range defined in the present invention results in an unloaded Q value which is lower than in the case where Pb is not substituted.

EXAMPLE 4

Compositions of the main components used were those of Sample Numbers 9b, 15b and 23b of Table 2, to which CuO was added in different amounts as a Cu component. These compositions were sintered and subjected to measurements of characteristics in the same manner as in Example 1. The results are shown in Table 4.

TABLE 4

| Sample No. | Composition | | | | | | Sintering Temperature °C. | Dielectric Constant | Qu | τ f ppm/°C. |
| --- | --- | --- | --- | --- | --- | --- | --- | --- | --- | --- |
| | x | y | z | a | b | c | | | | |
| 9b-1 | 0.5 | 0.19 | 0.31 | 0.45 | 0.2 | 0 | 900 | 89 | 290 | −16 |
| 9b-2 | 0.5 | 0.19 | 0.31 | 0.45 | 0.2 | 0.02 | 875 | 86 | 380 | −21 |
| 9b-3 | 0.5 | 0.19 | 0.31 | 0.45 | 0.2 | 0.06 | 875 | 85 | 320 | −38 |
| 9b-4# | 0.5 | 0.19 | 0.31 | 0.45 | 0.2 | 0.08 | 875 | 85 | 270 | −53 |
| 15b-1 | 0.46 | .215 | 0.325 | 0.25 | 0.2 | 0 | 925 | 76 | 450 | +4 |
| 15b-2 | 0.46 | .215 | 0.325 | 0.25 | 0.2 | 0.02 | 900 | 74 | 570 | +1 |
| 15b-3 | 0.46 | .215 | 0.325 | 0.25 | 0.2 | 0.06 | 875 | 72 | 530 | −3 |
| 15b-# | .46 | .215 | 0.325 | 0.25 | 0.2 | 0.08 | 875 | 69 | 450 | −12 |
| 23b-1 | 0.41 | .235 | 0.355 | 0.25 | 0.2 | 0 | 925 | 90 | 550 | +6 |
| 23b-2 | 0.41 | .235 | 0.355 | 0.25 | 0.2 | 0.02 | 900 | 88 | 660 | +3 |
| 23b-3 | 0.41 | .235 | 0.355 | 0.25 | 0.2 | 0.06 | 875 | 85 | 630 | −4 |
| 23b-4# | .41 | .235 | 0.355 | 0.25 | 0.2 | 0.08 | 875 | 82 | 540 | −11 |

In the above table, compositions of Sample Numbers with the mark "#" are outside the scope of the invention and thus for comparison.

The results of Table 4 reveal that the addition of Cu within a defined range of the invention is effective in lowering the sintering temperature with the unloaded Q value being improved. On the contrary, the addition of Cu in an amount exceeding the defined range lowers the dielectric constant and the unloaded Q value.

EXAMPLE 5

A multilayer microwave device was made by use of the dielectric compositions of the invention. The device was a dielectric resonator shown in FIGS. 2 to 5 wherein strip line conductor was interleaved in a sintered, dielectric ceramic body to provide a structure which had shield conductor layers and a coupling capacitor therein.

Fabrication of the resonator is described with reference to FIGS. 2 to 5 using the composition of Sample No. 23 of Table 1.

A calcined powder of a dielectric material No. 23 to which 0.3 wt % of CuO was added was prepared in the same manner as in Example 1. The calcined powder was mixed with a polyvinyl butyral resin binder, a butyl acetate solvent for the binder and a dibutyl phthalate plasticizer, thereby obtaining a slurry having a powder content of 65 wt %. The slurry was applied onto a polyethylene terephthalate sheet by doctor blading and dried to obtain sheets with a dry thickness of 50 to 70 micrometers.

Separately, different types of metals indicated in Table 5 were provided for use as a conductor metal and mixed with a vehicle to obtain pastes provided that if Cu was used as the conductor metal, a CuO paste was provided.

Each paste was used for printing in patterns as shown in FIGS. 5a to 5c. The strip line length pattern 3 of FIG. 5b had a length of 13 mm.

The buildup and printing procedures were conducted in the following manner.

A plurality of the dielectric material sheets were built up, after which a conductor pattern 2 of FIG. 5a was printed on the uppermost sheet, followed by building up a plurality of the sheets. Thereafter, a narrow conductor pattern 3 of FIG. 5b was printed on the uppermost sheet of the built-up sheets, followed by further building up of a plurality of the dielectric sheets, printing a conductor pattern 4 of FIG. 5c and still further building up of a plurality of the sheets. The resultant green product was thermally pressed at a pressure of 30 kg/cm$^2$. The pressed article was cut into individual elements, followed by thermal treatment in air at 600° C. to remove the binder. When the CuO paste was used, the element was subsequently thermally treated in H$_2$ to reduce it into Cu and sintered at 925° C. in N$_2$. With the other conductors, the elements were sintered in air at 925° C.

Figure 3:
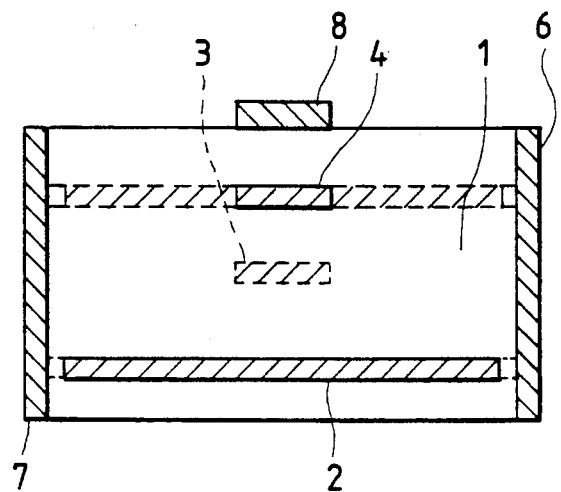
FIGS. 3 and 4 are, respectively, a cross-sectional view and a perspective view of the resonator of FIG. 2.
Figure 4:
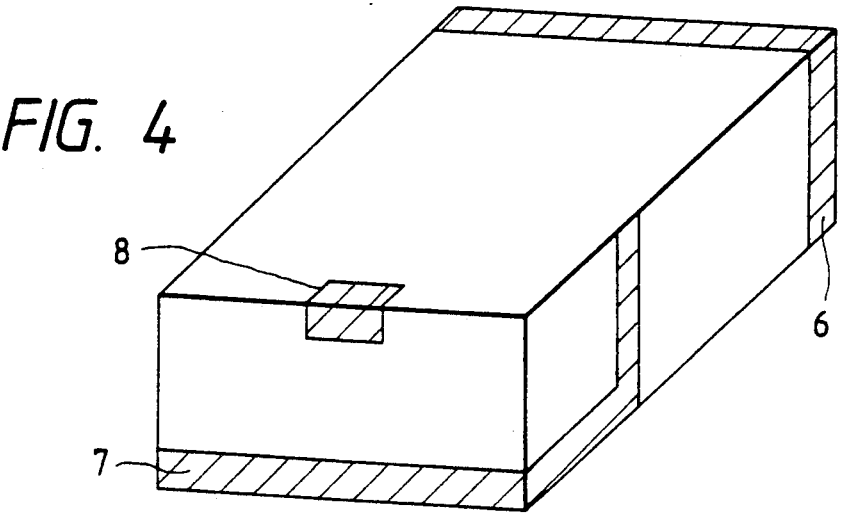

Thereafter, external electrodes were attached to the sintered body, as shown in FIGS. 2 to 4, using a commercially available Cu paste to obtain a multilayer type dielectric resonator having a capacitor and the shield conductor metal layers therein.

After the sintering, the strip line was found to have a length of from 11.4 to 11.5 mm. Thus, shrinkage took place.

Ten elements were made for the respective conductors to determine average values of a resonance frequency and a Q value. The results are shown in Table 5 below.

TABLE 5

| Conductor Electrode | Resonance Frequency MHz | Unloaded Q |
| --- | --- | --- |
| Cu | 805 | 180 |
| Ag | 800 | 190 |
| 99% Ag/1% Pt | 790 | 180 |
| 95% Ag/5% Pd | 790 | 170 |
| Au | 810 | 180 |

The results of Table 5 reveal that the resonance frequency is close to or over 800 MHz for all the cases. The Q value is as high as not less than 100 and is thus excellent.

What is claimed is:

1. A dielectric ceramic composition which consists essentially of a sintered mixture represented by the formula

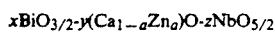

wherein x, y and z independently represent a weight fraction and x+y+z=1, x, y and z are within a pentagonal range surrounded by lines plotted between points A, B, C, D and E in a ternary ceramic composition of FIG. 1 where a is an atomic ratio of substituted Zn to Ca, and 0<a≦0.6, the points A, B, C, D and E, respectively, corresponding to those points of (x, y, z)=(0.55, 0.16, 0.29), (x, y, z)=(0.5, 0.21, 0.29), (x, y, z)=(0.5, 0.175, 0.325), (x, y, z)=(0.345, 0.28, 0.375), and (x, y, z)=(0.345, 0.245, 0.41).

2. A dielectric ceramic composition according to claim 1, further comprising a Cu component in an amount that Cu/(Bi+Ca+Zn+Nb)≦0.06.

3. A dielectric ceramic composition which consists essentially of a sintered mixture represented by the formula

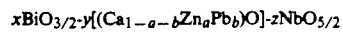

wherein x, y and z independently represent a weight fraction and x+y+z=1, x, y and z are within a pentagonal range surrounded by lines plotted between points A, B, C, D and E in a ternary ceramic composition of FIG. 1 where a is an atomic ratio of substituted Zn to Ca and b is an atomic ratio of substituted Pb to Ca, and 0<a≦0.6 and 0<b≦0.4, the points A, B, C, D and E, respectively, correspond to those points of (x, y, z)=(0.55, 0.16, 0.29), (x, y, z)=(0.5, 0.21, 0.29), (x, y, z)=(0.5, 0.175, 0.325), (x, y, z)=(0.345, 0.28, 0.375), and (x, y, z)=(0.345, 0.245, 0.41).

4. A dielectric ceramic composition according to claim 3, further comprising a Cu component in an amount that Cu/(Bi+Ca+Zn+Nb)≦0.06.

5. A microwave device which comprises a body made of sintered dielectric ceramic layers, a pair of spaced shield conductor metal layers formed on opposite sides of the body for connection to ground, and a strip line metal conductor layer provided between and spaced from the pair of spaced shield conductor metal layers through the ceramic layer on each side of the strip line metal conductor layer and made of a member selected from the group consisting of Cu, Ag, Au and mixtures and alloys thereof, the sintered dielectric ceramic layers which are provided between the pair of spaced shield conductor metal layers in contact with the strip line metal conductor layer on the opposite sides thereof being made of a dielectric ceramic composition which consists essentially of a sintered mixture represented by the formula

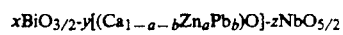

wherein x, y and z independently represent a molar fraction and x+y+z=1, x, y and z are within a pentagonal range surrounded by lines, inclusive, plotted between points, A, B, C, D and E in a ternary ceramic composition of FIG. 1 where a is an atomic ratio of substituted Zn to Ca and b is an atomic ratio of substituted Pb to Ca, and 0<a≦0.6 and 0≦b≦0.4, the points A, B, C, D and E, respectively, correspond to those points of (x, y, z)=(0.55, 0.16, 0.29), (x, y, z)=(0.5, 0.21, 0.29), (x, y, z)=(0.5, 0.175, 0.325), (x, y, z)=(0.345, 0.28, 0.375), and (x, y, z)=(0.345, 0.245, 0.41).

6. The microwave device according to claim 5, wherein said member further comprises up to 10 wt % of a metal selected from the group consisting of platinum group metals and tungsten.

7. The microwave device according to claim 5, wherein sintered dielectric ceramic covering layers are further provided on the respective paired shield conductor metal layers.

8. The microwave device according to claim 7, wherein said sintered dielectric ceramic covering layers are each made of low sintering alumina or glass.

9. The microwave device according to claim 5, further comprising a conductor metal layer associated with said strip line conductor metal layer to form a capacitance gas therebetween.

10. The microwave device according to claim 9, wherein said conductor metal layer is made of a member selected from the group consisting of Cu, Ag, Au and mixtures and alloys thereof.

11. The microwave device according to claim 10, wherein said member further comprises up to 10 wt % of a metal selected from the group consisting of platinum group metals and tungsten.

12. The microwave device according to claim 5, further comprising a Cu component in said ceramic composition in an amount which satisfies $Cu/(Bi+Ca+Zn+Nb) \leqq 0.06$.

13. The microwave device according to claim 5, wherein $b=0$.

* * * * *